Nov. 17, 1959  E. GINN  2,912,885
PLANETARY BEVEL GEAR REVERSING TRANSMISSION
Original Filed March 30, 1950  4 Sheets-Sheet 1
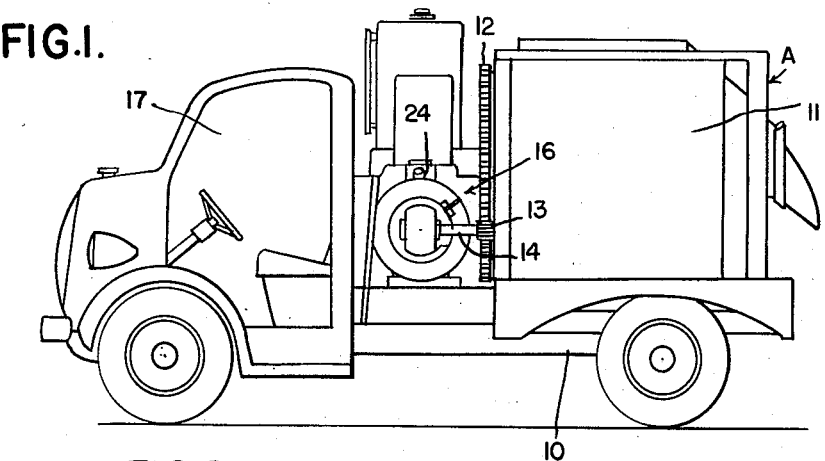
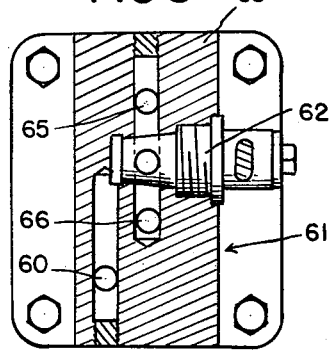
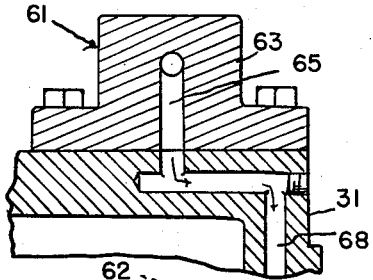
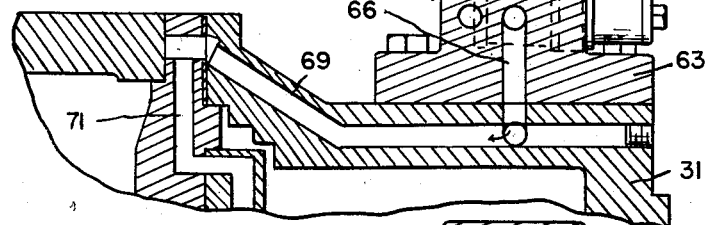
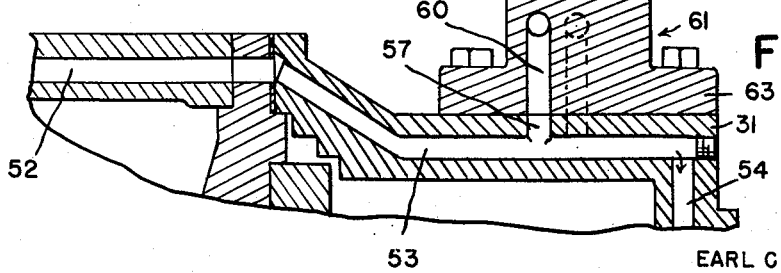
INVENTOR.
EARL C. GINN
BY Hauke r Hardesty
ATTORNEYS Nov. 17, 1959     E. GINN     2,912,885
PLANETARY BEVEL GEAR REVERSING TRANSMISSION
Original Filed March 30, 1950     4 Sheets-Sheet 2

*INVENTOR.*
EARL C. GINN

BY
*Hauker Hardesty*
ATTORNEYS

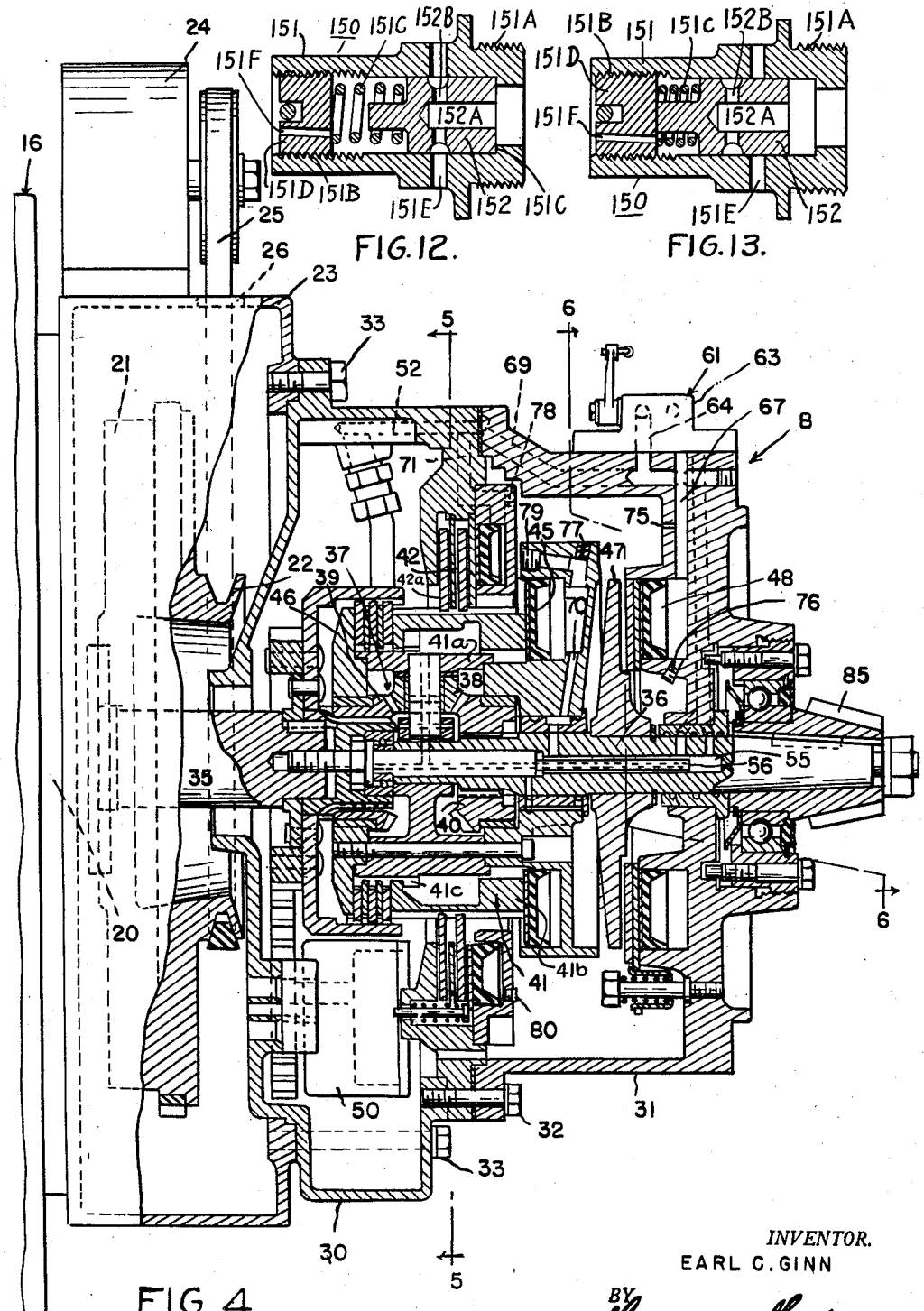

Nov. 17, 1959     E. GINN     2,912,885
PLANETARY BEVEL GEAR REVERSING TRANSMISSION
Original Filed March 30, 1950     4 Sheets-Sheet 4
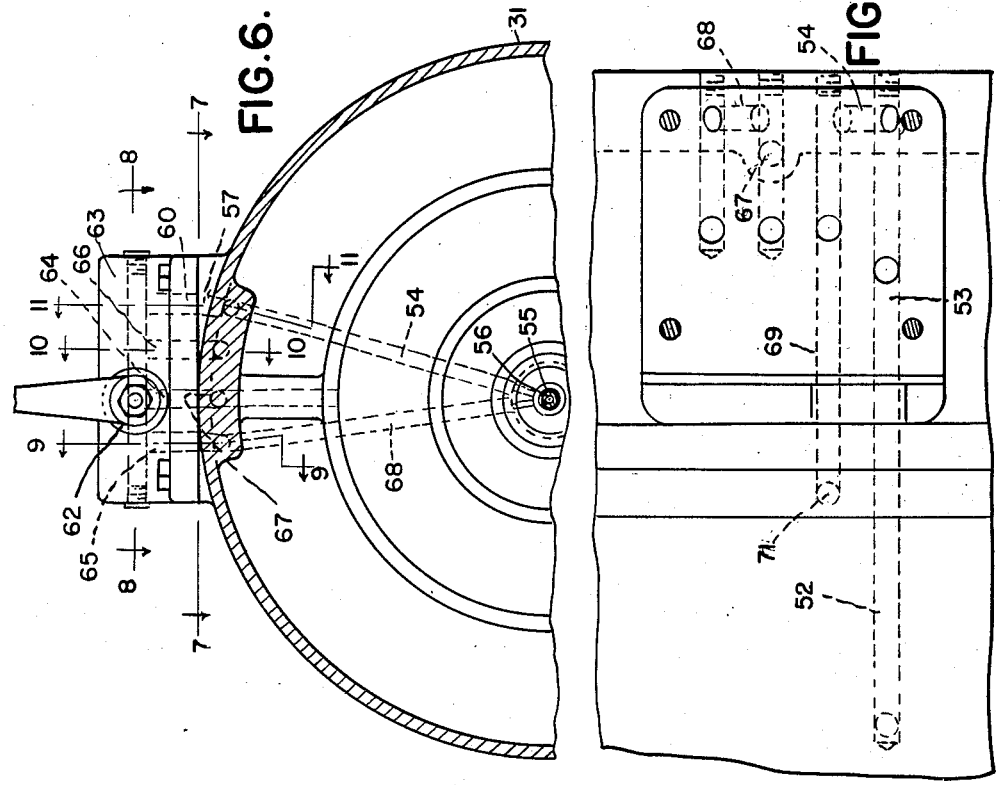
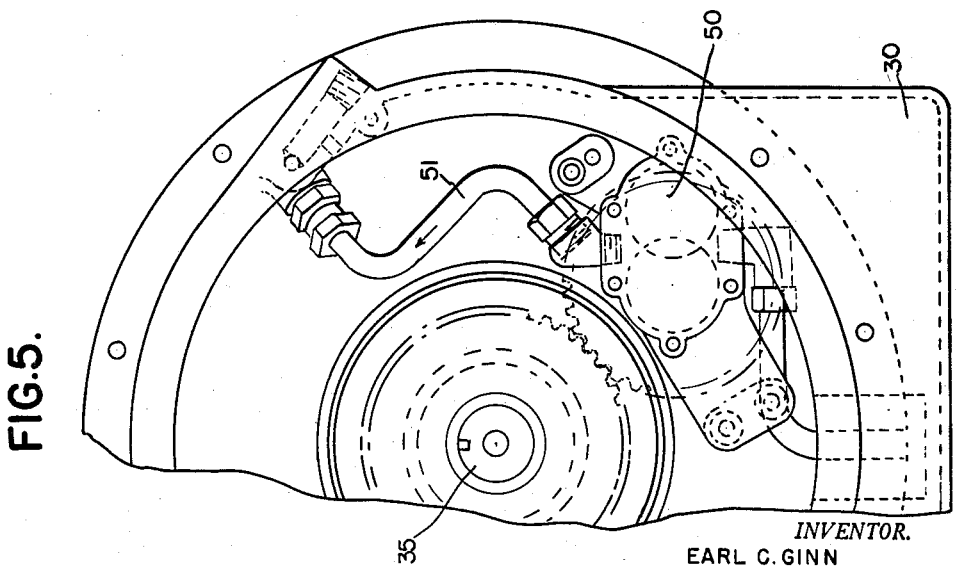
INVENTOR.
EARL C. GINN
BY
Hauke + Hardesty
ATTORNEYS United States Patent Office 2,912,885
Patented Nov. 17, 1959

2,912,885

PLANETARY BEVEL GEAR REVERSING TRANSMISSION

Earl Ginn, Muskegon, Mich., assignor to Continental Motors Corporation, Muskegon, Mich., a corporation of Virginia Continuation of application Serial No. 152,933, March 30, 1950. This application March 5, 1956, Serial No. 569,416

6 Claims. (Cl. 74—780)

This invention relates to transmission assemblies and more particularly to a transmission assembly adapted for service with a power driven machine such as a transit cement mixer or other industrial machines in which a heavy load of material is moved. Such machines are moved forward or reverse, and when applied to a cement mixer carrying a heavy load of wet cement weighing in the neighborhood of from four to seven or eight tons, the machine is constructed so that same can be slowly agitated in transit and so constructed that the cement drum can be reversed in order to discharge the contents thereof.

The torque required to rotate the drum of a cement mixer is many times the torque produced by the engine, and the transmissions, as are presently employed to transmit engine torque to said drum and to drive same at a speed approximately about ten revolutions per minute, and which incorporate a reversing means intermediate the transmission and cement drum, are necessarily quite bulky and massive.

An object of the present invention is to construct a transmission assembly suitable for application with a transit cement mixer or other power driven machines which is less bulky and not near as massive, but which is capable of doing the work demanded of it, and this has been accomplished and aided to a large degree by reason of the fact that in this proposed construction, the reversal of the drive is carried out in connection with shafts operating at engine speed and which are then transmitting a minimum of torque.

Further objects of the invention pertaining to other features of the invention will be apparent as the description progresses.

For a more detailed understanding of the invention reference may be had to the accompanying drawings illustrating a preferred embodiment of the invention showing one application thereof, wherein like characters refer to like parts throughout the several views, and in which Fig. 1 is a side elevational view of a transit cement mixer.

Fig. 4 is a longitudinal sectional view of the reversing transmission.

Fig. 5 is a transverse sectional view taken on the line 5—5 of Fig. 4.

Fig. 6 is a fragmentary view of the rear transmission case of the reverse transmission mechanism illustrating the control valve and the passages leading to the various clutch means and brake which are to be actuated.

Fig. 7 is a fragmentary plan view of the reversing transmission casing, showing some of the passages and taken on the line 7—7 of Fig. 6.

Figs. 8 to 11 inclusive are sectional views of said control valve and parts of the transmission casing taken respectively on the lines 8—8, 9—9, 10—10 and 11—11 of Fig. 6.

Figs. 12 and 13 are central longitudinal sectional views of a dump valve applicable for use with this system, and showing such valve in two positions, Fig. 12 showing same open and Fig. 13 showing same closed.

One type of machine, for which the present power transmission means is particularly practical is a transit cement mixer, and such an application is preferably illustrated here in detail. This is a continuation application of Serial No 152,933, filed March 30, 1950, for Reversing Transmission.

Figure 3:
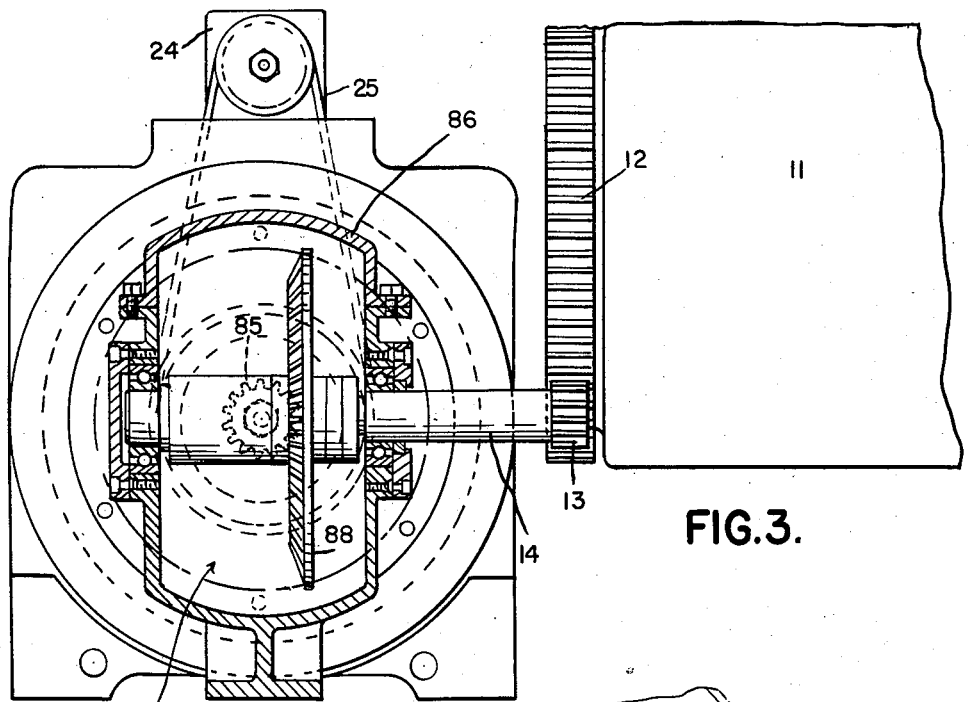
Fig. 3 is a view in section taken on the line 3—3 of Fig. 2.
Figure 2:
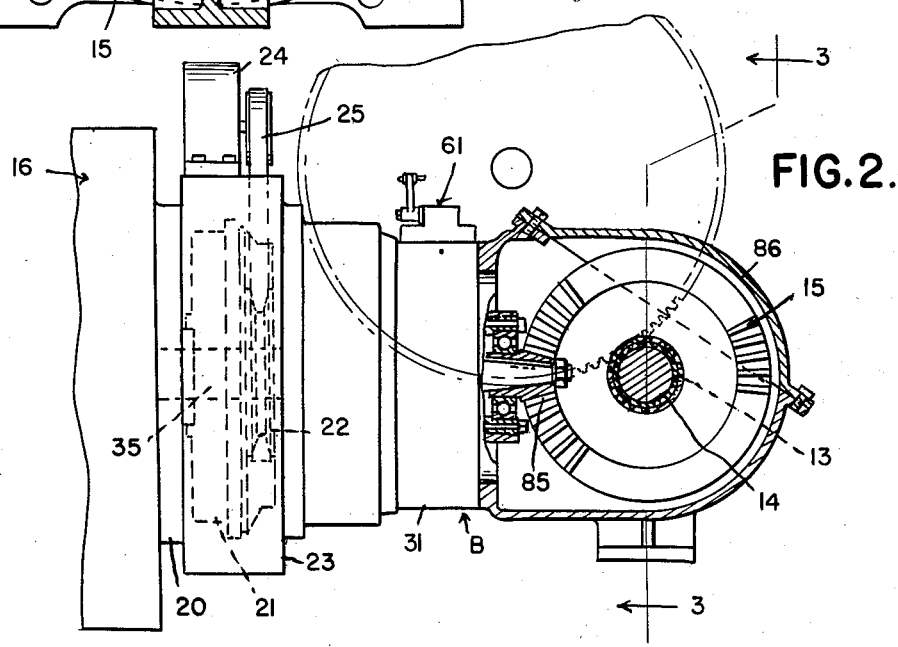
Fig. 2 is an elevational view of the transmission means, which parts of the casing are broken away to illustrate the reduction drive.

Referring more particularly to Figs. 1 to 4 inclusive, the reference character A designates a transit cement mixer as a whole, the component parts of which comprise a truck chassis 10 on which a cement drum 11 is rotatably mounted, a large gear 12 being carried by said drum and which meshes with a smaller gear 13 carried by the output shaft 14 of the speed reduction or torque multiplying transmission means 15. An engine 16 is mounted on the truck chassis, preferably immediately to the rear of the truck cab 17, and a forward and reverse transmission mechanism B operating at engine speed is interposed between the engine and the speed reduction means.

The engine crankshaft 20 carries a flywheel 21 provided with a pulley 22, and is housed within a flywheel housing 23, on top of which is mounted a water pump 24 or other accessory driven by a belt 25 from the pulley 22 on the flywheel, said belt passing through openings 26 in the flywheel housing for direct driving connection with a pulley on the accessory.

The reversing transmission mechanism, indicated as a whole by reference character B is housed within a casing composed of the front casing 30 and rear casing 31, said casings being bolted together and to the flywheel housing by bolts 32 and 33 respectively. This reversing mechanism comprises a driving shaft 35 and a driven shaft 36 drivingly connected together by a gearing assembly 37. The beveled planet gear 38 meshes with beveled gears 39 and 40 carried respectively by the driving and driven shafts 35 and 36 and said beveled gear is rotatably mounted in the carrier structure 41.

The carrier structure 41 comprises an inner ring like element 41a which rotatably carries the planet gears 38, and an outer cylindrical element 41b which is splined to the inner element as at 41c. Said outer cylindrical element of the carrier structure is externally splined and carries the braking elements 42a which coact with the braking means 42 to lock the carrier structure to the transmission casing when the said braking means is actuated. The braking means 42 is actuated to clutch the carrier to the transmission housing, said braking means being hydraulically actuated and when so actuated, looks the carrier against rotation, and causes the driven shaft 36 to rotate in the opposite direction from the driving shaft 35. A speed ratio of 1:1 is had between the said driving and driven shafts. A hydraulic piston actuating means 45 is disposed to operatively clutch the carrier to the end plate 46 and to cause the carrier structure 41 to rotate as a unit with the driving shaft 35 and thus the driven shaft 36 is driven in the same direction as the driving shaft. If desired, a disc or wheel 47 may be mounted directly on the driven shaft 36 and a hydraulically actuated second brake means 48 is then employed to brake the driven shaft when changing the operation from forward to reverse or from reverse to forward speed.

An oil pump 50 is preferably mounted within the front casing 30, picking up oil from a sump and delivering it through the conduit 51 to the intake passage 52 in the wall of the casing 30. The rear housing section 31 carries drilled passages for conveying this oil under pressure to the various clutch and brake means which are operable to actuate the reversing mechanism and to other parts, such as bearings which are to be lubricated. The passage 53 in the rear casing or housing section 31 extends to the rear wall where it connects with another passage 54 leading to the center of the driven shaft, where it is fed through the bore 55 in the quill 56 and thence forwardly to such parts of the mechanism which are to be lubricated.

A passage 57 leads off of passage 53 to the inlet 60 of the control valve 61 mounted on a pad carried by the rear housing section 31. A conventional three-way valve 62 is mounted in the valve casing 63 and is actuated to selectively distribute this oil under pressure to oil passages 64, 65 or 66 which respectively connect with passages 67, 68 and 69 in the rear housing section 31. Passage 67 leads to the brake means 48, passage 68 leads to the rear wall, thence to the center bearing and to the passage surrounding the quill 56 and thence through a passage 70 to the clutch piston means 45. Passage 69 leads forwardly where it connects with passage 71 in the front housing section 30 for conducting oil under pressure to the brake means 42.

A suitable bleed opening 75 connects passage 67 to the interior of the transmission casing and as soon as the valve 62 cuts off the supply of oil to this passage, the pressure immediately drops therein and the dump valve 76 described in the following paragraphs is then actuated to quickly dump the oil permitting the rapid retraction of the brake. Passages 70 and 71 are similarly vented with bleed holes 77 and 78 respectively and corresponding quick acting dump valves 79 and 80, operable in like manner as the dump valve 76 in response to an initial slight pressure drop in the oil pressure passages associated therewith. The above bleed openings serve to so quickly drop the pressure in the line that the dump valves are rapidly actuated to completely dump the oil and permit an extremely rapid reversal of the clutching mechanism.

These dump valves 76, 79 and 80 are preferably of identical construction and are illustrated in detail in Figs. 12 and 13, wherein same are indicated as a whole by reference character 150 and as shown in Figs. 12 and 13, consist of a tubular element 151 externally threaded at one end 151A and internally threaded at the other end 151B. Adjacent the end 151A the bore of the element 151 is provided with a shoulder 151C serving to limit the movement of a slidable valve plunger 152, this latter being resiliently thrust toward the shoulder by a spring 151C reacting against a suitable adjusting screw plug 151D.

As shown, the plunger 152 is axially bored as at 152A from its free end to near the other end and is provided with a radial passage 152B opening to the bore adjacent its closed end, while the element 151 is also provided with radial passages 151E adapted to register with passages 152B when the valve 152 is against the shoulder 151C. Free movement of the valve 152 is allowed by providing a passage 151F in the adjusting plug 151D.

In the operation of the brakes and clutches, by supplying fluid under pressure to pistons 48 or 45 or 42, the valves 152 will be moved inwardly of their housings 151 to the position of Fig. 13 and thereby move the passages 152B and 151E out of registry to close the valves and maintain them closed so long as the clutch actuating pressure is maintained. As soon, however, as this relatively high pressure is released, as the springs 151C immediately move the valves 152 to the position of Fig. 12 wherein the passages 151E and 152B are in registry, thus quickly relieving the fluid pressure applied to the clutch and brake actuating means aforesaid.

The driven shaft 36 extends rearwardly through the rear wall of the housing section 31 and terminates in a beveled gear 85. A housing or casing 86 is bolted to the rear housing section 31 and contains a speed reduction gear mechanism, comprising the output shaft 14 on which is mounted a large diameter beveled ring gear 88 meshing with the small diameter beveled gear or pinion 85. This output shaft extends through the wall of the housing 86, carrying on its extremity the pinion 13 that engages the gear 12 mounted on said cement drum 11. The gears 85—88 and 12—13 constitute speed reduction means or torque multiplying power transmission mechanism.

In the application of the present invention to a transit cement mixer the speed of the unit (a cement drum in this instance) is perhaps in the neighborhood of about 6 to 12 r.p.m. as compared to the engine speed of around 1200 to 1600 r.p.m., a speed reduction of about 200 times. In other applications, such as earth moving equipment and material moving trucks and other machines with which the present invention may be desirably assembled, the part to be driven may not be of a speed as low as the cement drum of a mixer, but in all such applications, it is found quite essential and desirable to change from forward to reverse, or to neutral by mechanism operable to function at engine speed. As such speeds are reduced from engine speed or direct drive to 4:1, 10:1, 50:1, or 100 to 200:1, the torque is correspondingly increased. Therefore a reversing transmission operable on machine elements operating at such reduced speeds must be correspondingly massive and of such construction as to carry these heavy loads.

In the present assembly, the reversing mechanism is operable on driving and driven shafts operating at engine speed, and this combination is specially useful and advantageous with power driven machines such as transit concrete mixers and heavy earth moving machines, especially those requiring frequent reversal of the drive.

The housing or casing 86 is symmetrically constructed about the gear 85 and the bolts securing this casing 86 to casing 31 are angularly spaced equally about the axis of the gear 85 and symmetrical therewith so that the casing 86 may be assembled to casing 31 in a plurality of positions. Thus, the output shaft 14 may be positioned to extend to either side of the casing 86, or up or down. If desired, it may be constructed to allow such adjustments every 30, 60 or 90 degrees, though for most practical purposes, 90 degree adjustments are quite satisfactory.

It will be apparent to those skilled in the art to which this invention pertains that various changes and modifications may be made therein without departing from the spirit of the invention or from the scope of the appended claims.

I claim:

1. An engine driven unitary reversing power transmission mechanism for transit cement mixers and similar heavy-duty machines, and mounted directly to said engine, said engine having a crankshaft and a flywheel attached directly to the crankshaft and a flywheel housing carried by said engine, said transmission mechanism comprising a casing, the interior of which is provided with a pair of separate braking elements, axially aligned driving and driven shafts mounted in said casing, said driving shaft axially aligned and directly drivingly connected with said engine crankshaft, said driving shaft provided with a clutch element, said casing having an inner end wall disposed between said flywheel and said clutch element and provided with a central opening through which said engine crankshaft projects, planetary gearing interconnecting said driving and driven shafts and including driving and driven gears carried respectively by the driving and driven shafts, a planet pinion meshing with each of said gears, and a planet carrier rotatably surrounding said gears and rotatably supporting said planet gear, said carrier having clutch means cooperable with said driving shaft clutch element and brake means cooperable with one of said casing braking elements; separate hydraulic means within the casing for respectively actuating said carrier clutch means and brake means; a brake disc carried by the driven shaft within the casing and disposed to the other side of said planetary gearing from the clutch element carried by the driving shaft and cooperable with the other of said casing braking elements; hydraulic actuating means for interengaging such casing braking element and brake disc; fluid pressure supplying means connected to each of said hydraulic means; and a volitionally operable valve for controlling the flow of fluid under pressure to each of said hydraulic actuating means whereby to secure alternative engagement only of the clutch means and the braking means of said carrier with their respective companion elements, and engagement between said second casing braking element and the driven shaft braking disc only when neither of said carrier clutching or braking means is engaged, said planetary gearing constructed and arranged to drive said driven shaft during both forward and reverse operation at substantially the same speed as said driving shaft, said driving shaft being operated at engine speed.

2. An engine driven unitary reversing power transmission mechanism for transit cement mixers and similar heavy duty machines, and mounted directly to said engine, said engine having a crankshaft and a flywheel attached directly to the crankshaft as a flywheel housing carried by said engine, said transmission mechanism comprising a casing, the interior of which is provided with a pair of separate braking elements, axially aligned driving and driven shafts mounted in said casing, said driving shaft axially aligned and directly drivingly connected with said engine crankshaft, said driving shaft provided with a clutch element, said casing having an inner end wall disposed between said flywheel and said clutch element and provided with a central opening through which said engine crank shaft projects, planetary gearing interconnecting said driving and driven shafts and including driving and driven gears carried respectively by the driving and driven shafts, a planet pinion meshing with each of said gears, and a planet carrier rotatably surrounding said gears and rotatably supporting said planet pinion, said carrier having clutch means cooperable with said driving shaft clutch element and brake means cooperable with one of said casing braking elements; separate hydraulic means within the casing for respectively actuating said carrier clutch means and brake means; a brake disc carried by the driven shaft within the casing and disposed to other side of said planetary gearing from the clutch element carried by the driving shaft and positioned in cooperative relation to the other of said casing braking elements; hydraulic actuating means for interengaging such casing braking element and brake disc; fluid pressure supplying means connected to each of said hydraulic means; and a volitionally operable valve for controlling the flow of fluid under pressure to each of said hydraulic actuating means, whereby to secure alternative engagement only of the clutch means and the braking means of said carrier with their respective companion elements, and engagement between said second casing braking element and the driven shaft braking disc only when neither of said carrier clutching or braking means is engaged, said planetary gearing constructed and arranged to drive said driven shaft during both forward and reverse operation at substantially the same speed as said driving shaft, said driving shaft being operated at engine speed, said hydraulic actuating means provided with quick acting automatically operable dump valves associated with the fluid pressure supplying means for said brake and clutch hydraulic actuating means and serving to permit immediately disengagement of said clutches and brakes on operation of said volitionally operable valve.

3. An engine driven unitary reversing power transmission mechanism for transit cement mixers and similar heavy duty machines and mounted directly to said engine, said engine having a crankshaft and a flywheel attached directly to the crankshaft, and a flywheel housing carried by said engine, said transmission mechanism comprising a casing having a braking element, axially aligned driving and driven shafts mounted in said casing, said driving shaft axially aligned and directly drivingly connected with said engine crankshaft, and said driving shaft provided with a clutch element, said casing having an inner end wall disposed between said flywheel and said driving shaft clutch element and provided with a central opening through which said engine crankshaft projects, planetary gearing interconnecting said driving and driven shafts and including driving and driven gears carried respectively by the driving and driven shafts, a planet gear meshing with each of said gears, and a planet carrier structure rotatably surrounding the gears and rotatably supporting said planet gear, said carrier having clutch means cooperable with said driving shaft clutch element and brake means cooperable with said casing braking element, selectively actuable separate hydraulic pressure means within the casing for independently locking the carrier braking means with said casing braking element or said carrier clutch means with said driving shaft clutch element and both said hydraulic pressure means located in the casing on the opposite axial side of the planetary gear assembly and carrier from said casing inner end wall and said hydraulic pressure means being constructed and arranged to exert forces forwardly toward said driving gear, fluid pressure supplying means connected to each of said hydraulic pressure means, and a volitionally operable valve for controlling the flow of fluid under pressure to each of said hydraulic actuating means whereby to secure alternative engagement only of said carrier clutch means and braking means with their respective companion clutch and brake elements, said planetary gearing constructed and arranged to drive said driven shaft during both forward and reverse operation at substantially the same speed as said driving shaft, said driving shaft being operated at engine speed.

4. An engine driven unitary reversing power transmission mechanism for transit cement mixers and similar heavy-duty machines, and mounted directly to said engine, said engine having a crankshaft and a flywheel attached directly to the crankshaft and a flywheel housing carried by said engine, said transmission mechanism comprising a casing, the interior of which is provided with braking means, axially aligned driving and driven shafts mounted in said casing, said driving shaft axially aligned and directly drivingly connected with said engine crankshaft and said driving shaft provided with a clutch element, said casing having an inner end wall disposed between said flywheel and said driving shaft clutch element and provided with a central opening through which said engine crankshaft projects, planetary gearing interconnecting said driving and driven shafts and including driving and driven gears carried respectively by the driving and driven shafts, and planet gears meshing with said driving and driven gears, a carrier structure rotatably surrounding said gears and rotatably supporting said planet gears, an outer element non-rotatably connected with and carried by said carrier structure and axially movable with respect thereto, said carrier structure carrying clutch means coacting with the driving shaft clutch element and said outer element carrying a braking element coacting with the braking means of said casing, hydraulic actuating means moving said outer element to clutch the carrier structure clutch means to said driving shaft clutch element, hydraulic actuating means to lock the casing braking means with the braking element of said outer element carried by the carrier structure, and a volitionally operable valve for controlling the flow of fluid under pressure to each of said hydraulic actuating means, whereby to secure alternative engagement only of said carrier clutch means and casing braking means with the respective companion clutch and brake elements, said planetary gearing constructed and arranged to drive said driven shaft during both forward and reverse operation at substantially the same speed as said driving shaft, said driving shaft being operated at engine speed.

5. An engine driven unitary reversing power transmission mechanism for transit cement mixers and similar heavy-duty machines, and mounted directly to said engine, said engine having a crankshaft and a flywheel attached directly to the crankshaft and a flywheel housing carried by said engine, said transmission mechanism comprising a casing, the interior of which is provided with braking means, axially aligned driving and driven shafts mounted in said casing, said driving shaft axially aligned and directly drivingly connected with said engine crankshaft and said driving shaft provided with a clutch element, said casing having an inner end wall disposed between said flywheel and said driving shaft clutch element and provided with a central opening through which said engine crankshaft projects, planetary gearing interconnecting said driving and driven shafts and including driving and driven gears carried respectively by the driving and driven shafts, and planet gears meshing with said driving and driven gears, a carrier structure rotatably surrounding said gears and rotatably supporting said planet gears, an outer element non-rotatably connected with and carried by said carrier structure and axially movable with respect thereto, said carrier structure carrying clutch means coacting with the driving shaft clutch element and said outer element carrying a braking element coacting with the braking means of said casing, hydraulic actuating means moving said outer element to clutch the carrier structure clutch means to said driving shaft clutch element, hydraulic actuating means to lock the casing braking means with the brake element of said outer element carried by the carrier structure, and a volitionally operable valve for controlling the flow of fluid under pressure to each of said hydraulic actuating means, whereby to secure alternative engagement only of said carrier clutch means and casing braking means with the respective companion clutch and brake elements, said planetary gearing constructed and arranged to drive said driven shaft during both forward and reverse operation at substantially the same speed as said driving shaft, said driving shaft being operated at engine speed, the carrier structure having external splines to which are splined said carrier structure clutch means, and said outer element splined to said external splines of the carrier structure and having external splines to which said outer element braking element is splined.

6. An engine driven unitary reversing power transmission mechanism for transit cement mixers and similar heavy-duty machines, and mounted directly to said engine, said engine having a crankshaft and a flywheel attached directly to the crankshaft and a flywheel housing carried by said engine, said transmission mechanism comprising a casing, the interior of which is provided with braking means, axially aligned driving and driven shafts mounted in said casing, said driving shaft axially aligned and directly drivingly connected with said engine crankshaft and said driving shaft provided with a clutch element, said casing having an inner end wall disposed between said flywheel and said driving shaft clutch element and provided with a central opening through which said engine crankshaft projects, planetary gearing interconnecting said driving and driven shafts and including driving and driven gears carried respectively by the driving and driven shafts, and planet gears meshing with said driving and driven gears, a carrier structure rotatably surrounding said gears and rotatably supporting said planet gears, an outer element non-rotatably connected with and carried by said carrier structure and axially movable with respect thereto, said carrier structure carrying clutch means coacting with the driving shaft clutch element and said outer element carrying a braking element coacting with the braking means of said casing, hydraulic actuating means moving said outer element to clutch the carrier structure clutch means to said driving shaft clutch element, hydraulic actuating means to lock the casing braking means with the brake element carried by said outer element of the carrier structure, fluid pressure supplying means connected to each of said hydraulic actuating means, and a volitionally operable valve for controlling the flow of fluid under pressure to each of said hydraulic actuating means, whereby to secure alternative engagement only of said carrier clutch means and casing braking means with the respective companion clutch and brake elements, said planetary bearing constructed and arranged to drive said driven shaft during both forward and reverse operation at substantially the same speed as said driving shaft, said driving shaft being operated at engine speed, said hydraulic actuating means provided with quick acting automatically operable dump valves associated with the fluid pressure supplying means for said brake and clutch hydraulic actuating means and serving to permit immediate disengagement of said clutches and brakes on operation of said volitionally operable valve.

References Cited in the file of this patent

UNITED STATES PATENTS

| | | |
|---|---|---|
| 1,653,262 | Dickson | Dec. 20, 1927 |
| 1,979,435 | Barnett | Nov. 6, 1934 |
| 1,979,488 | Perez | Nov. 6, 1934 |
| 2,011,597 | Stout | Aug. 20, 1935 |
| 2,018,014 | Fahrney | Oct. 22, 1935 |
| 2,156,118 | Kliesrath | Apr. 25, 1939 |
| 2,158,054 | Bradbury | May 16, 1939 |
| 2,172,126 | Lansing | Sept. 5, 1939 |
| 2,180,469 | Jaeger et al. | Nov. 21, 1939 |
| 2,193,880 | Peet | Mar. 19, 1940 |
| 2,323,753 | Jaeger et al. | July 6, 1943 |
| 2,418,455 | Banker | Apr. 8, 1947 |
| 2,456,614 | Banker | Dec. 21, 1948 |
| 2,466,616 | Shurts | Apr. 5, 1949 |
| 2,547,038 | Parrish | Apr. 3, 1951 |
| 2,574,431 | Banker | Nov. 6, 1951 |
| 2,669,971 | Mooney | Feb. 23, 1954 |
| 2,674,220 | Ware | Apr. 6, 1954 |

FOREIGN PATENTS

| | | |
|---|---|---|
| 1,077,704 | France | May 5, 1954 |
| 1,095,090 | France | Dec. 15, 1954 |